United States Patent Office 2,720,142
Patented Oct. 11, 1955

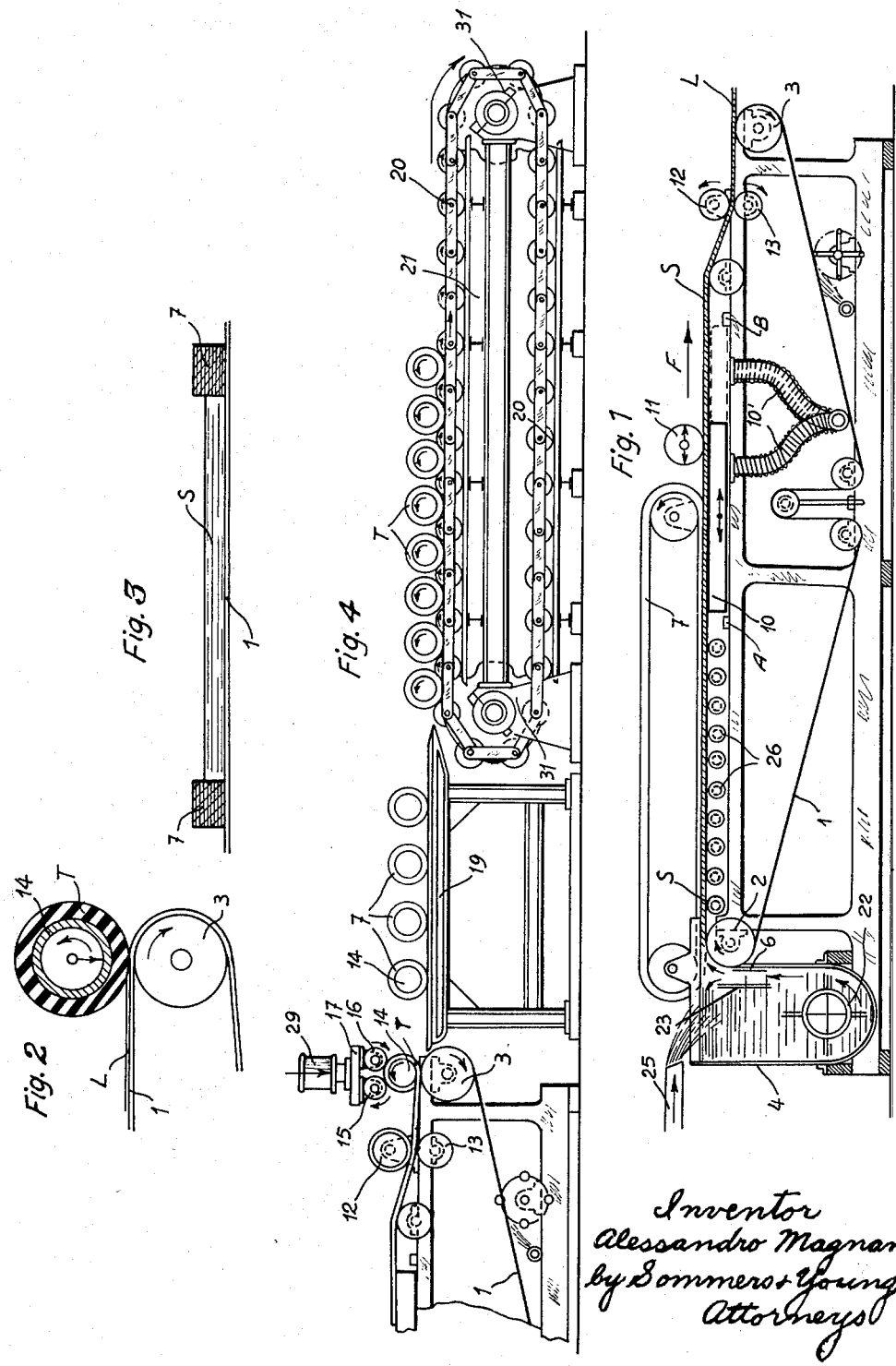

2,720,142

METHOD AND APPARATUS FOR MANUFACTURING ENDLESS FIBRO-CEMENT SHEETS

Alessandro Magnani, Broni, Italy

Application June 1, 1951, Serial No. 229,416

Claims priority, application Italy October 4, 1950

6 Claims. (Cl. 92—66)

This invention relates to a method of manufacturing an endless fibrocement sheet which, if of suitable thickness, may be cut and utilised in the form of slabs while, if it is very thin, it may be wound continuously on a mandrel for making tubes or slabs by cutting in the latter case the tube of a suitable diameter along a generatrix and laying it flat. The invention further concerns the apparatus for carrying out the method for manufacturing both slabs and tubes.

A fibrocement slurry is fed on an endless conveying filtering belt moved uniformly, from a vat provided with stirring means. The slurry is kept between rubber rules arranged along the side edges of the conveying belt.

A suction is exerted at a suitable point through the belt on the slurry which is laid thereon in order to remove most of its water content. Drying may be improved by combining it with squeezing the fibrocement layer, for instance by means of a roller.

Successively, the conveying belt with the substantially dried endless fibrocement sheet thereon is caused to travel between pairs of rollers which compress the sheet for further dehydration. The number of the roller pairs is selected in accordance with the desired degree of dehydration.

If the endless sheet is of the desired thickness for forming the slabs, the latter are obtained by cutting the sheet as it issues from the last pair of squeezing rollers.

When it is desired to manufacture tubular bodies, a very thin fibrocement sheet is formed on the endless belt and the dehydrated sheet is wound by known means on a mandrel equalling in diameter the bore of the article to be manufactured.

When the tube has reached the desired thickness, the apparatus is stopped and the resulting tube on the mandrel or on a core is sent to seasoning.

If the tube is intended for the manufacture of slabs therefrom, upon winding the layer to the desired thickness, the tubular body is cut along a generatrix and is laid flat forming the slab which, if required, may be corrugated by any suitable means.

According to an improvement, the tubes to be aged removed from the apparatus on which the tube has been wound, are mounted on rollers connected together to form an endless chain performing a slow movement. The chain rollers rest over the section in which they carry the tubes to be aged on guides on which they roll, thereby rotating the tubes resting thereon. This affords the double effect of feeding the tubes as they are formed and conferring them a satisfactory cylindrical shape. The ageing may be accelerated by heating the region in which the tubes travel on the roller chain.

The apparatus for carrying out this method shall be described with reference to the accompanying drawings which show diagrammatically its main features.

Figure 1 shows a general diagram of the apparatus for carrying out the method of forming endless fibrocement sheets.

Fig. 2 is a detail view of the outlet end of the machine, at which the sheet is wound on a mandrel for forming a tube.

Figure 3 is a detail cross sectional view of the belt carrying the fibro-cement slurry.

Figure 4 shows the endless conveyor for the tubes to be aged, which it simultaneously sets in rotation.

Referring to the drawings, 1 denotes the endless filtering belt, of which the upper branch, stretched between the rollers 2 and 3, is the operative branch in the process, while the lower branch is acted upon by the belt washing means.

The device for placing the layer of fibrocement on the belt 1 is arranged on the inlet of the belt and comprises a vat 4 having an opening cut in one of its side walls through which the belt extends, sealing the slot with the aid of the packing 6.

The vat 4 is fed through the conduit 25 with a quantity of fibrocement slurry such as to give the desired layer thickness.

A stirring mechanism is arranged on the bottom of the vat 4 and affords a uniform distribution of the constituents of the slurry. A vertical partition 23 is arranged in front of the belt 1 where the belt seals the opening in the vat wall and in spaced relationship thereto, and assists in continuously circulating the slurry in the vat and in forming a layer S of a suitable thickness on the belt 1 by effect of the continuous movement of the latter. The layer is conveyed by the horizontal branch of the belt 1, which travels on rollers 26 and on the suction table or tables 10 for dehydration, on which the layer is consolidated by removal of most of the water contained therein. The layer carried by the belt is retained laterally by two rubber strips 7, Figures 1 and 3.

On account of the considerable quantity of water contained in the slurry, a considerable vacuum would be required for removing water therefrom and would make impossible or, at least, difficult the displacement of the belt 1 on the table 10 during suction. According to this invention, the difficulty is removed by travelling the table 10 together with the belt 1 at the same speed as the latter over a certain length towards the position shown in dotted lines on the drawing. Upon reaching this position, suction through the conduit 10′ is automatically cut off and the table 10 is rapidly returned to its initial position, whereupon it is again moved forward together with the belt and suction is restored, and so on. The return movement may be accomplished, for example, by means of a weight, a hydraulic ram or other suitable means, while the forward movement may be obtained merely by the adherence between the belt and table by effect of suction.

The suction table 10 is fed forward in the direction of the arrow F by the effect of the adherence of the belt due to suction, this adherence being very strong on account of the large table surface. At the end of its stroke it abuts a reversing block B, by means of which suction by the table is cut off, the latter being quickly brought to its initial position by any suitable means, such as a counterweight. At the end of its return the table abuts the reversing block A by effect of which suction by the table is resumed, the cycle being repeated.

By suitably proportioning the table length and stroke, the vacuum and return stroke time, each point of the layer of slurry will be properly subjected to the suction through the table 10 and dehydrated, as the belt moves at a uniform speed.

For the sake of a more efficient dehydration, a pressure roller 11 is arranged on the outlet end of the table 10 and rotated about its own axis. For fuller dehydration, the belt 1 carrying the asbestos cement layer is compressed between two rollers 12, 13.

If slurry has been fed through the above described device in a sufficient quantity for forming a fresh fibro-cement sheet L of the desired thickness, said sheet is withdrawn from the machine and cut by means of a known cutter to the required length for forming slabs.

When manufacturing tubes, Figure 2, a very thin fibro-cement sheet is formed and a mandrel 14 is placed on the belt 1 above the roller 3, the mandrel 14 equalling in diameter the bore of the desired tube. The thin sheet L is wound on the mandrel 14 to the thickness of the desired tube T.

In order to improve compactness of the structure, the tube being formed is compressed by known means, for instance by means of rollers 15—16, Figure 4, carried by an equipment 17 acted upon by rams 29.

When the tube wound on the mandrel reaches the desired thickness, the apparatus is stopped and supply of the slurry is cut off. The equipment 17 is then lifted by means of the rams 29 and the mandrel 14 carrying the tube T is brought on a suitable support 19. If necessary, the tube is stripped from the mandrel 14 and threaded on a suitable core. The mandrels or the cores with the fibro-cement tubes T thereon are successively arranged on cradles for ageing.

The tubes T formed on the mandrels 14 are preferably arranged on two successive rollers of a set of rollers 20 connected together by an endless chain driven by wheels 31, Figure 4. The upper operative branch of the roller chain bear on stationary guides 21, on which the rollers 20 are free to rotate. The forward feed of the roller chain and rotation of the rollers 20 about their axis continuously rotate the asbestos-cement tubes T oppositely to the supporting rollers 20. This serves the double purpose of feeding the tubes as they are formed and conferring them a satisfactory cylindrical shape by effect of the movement of the supporting rollers 20.

The roller chain unit may be enclosed in a heated space in order to accelerate hardening of the tubes. The cores may be extracted, and re-utilized as soon as the tube has sufficiently hardened, that is, along the chain path or at the chain end. Successively, the tubes are ultimately aged and finished in known manner.

I wish it to be understood that I do not confine myself to the exact details described and shown by way of example and any mixtures of fibrous material and binder other than an asbestos cement mixture may be treated by the improved method and apparatus.

What I claim is:

1. The method of manufacturing an endless fibro-cement sheet suitable for making slabs and tubes, comprising projecting the inlet end of a conveyor band into a tank containing a watery fibro-cement slurry at a predetermined adjustable level, so that a continuous layer of fibrocement slurry is formed on said band, of a thickness equalling the difference in level between the surface of the slurry in tank and the upper side of the said conveyor band, dehydrating said layer by suction, and compressing the dehydrated layer for consolidating it.

2. The method of manufacturing a continuous fibro-cement sheet suitable for making tubes, comprising projecting the inlet end of a conveyor band into a tank of watery fibro-cement slurry at a predetermined adjustable level, so that a continuous layer of fibro-cement slurry is formed on said band, of a thickness equalling the difference in level between the surface of the slurry in the tank and the upper side of the said conveyor and dehydrating said layer by intermittent suction, compressing the dehydrated layer for consolidating it, winding said consolidated layer on a mandrel to form a tube of the desired thickness and ageing said tube as it is rotated on an endless roller chain.

3. Apparatus for manufacturing an endless fibro-cement sheet suitable for making tubes, comprising a tank supplied in an adjustable manner with a fibro-cement slurry, an endless conveyor band, of which the leading end projects into said tank through an opening cut in a wall of the tank in order to receive an endless layer of slurry of the desired thickness, a set of carrying rollers arranged under the leading edge of the upper portion of said conveyor, suction box under an intermediate portion of said upper portion, a pair of compression rollers near the trailing end of said portion, a cylinder at the outlet end on which the fibro-cement layer is wound, means for compressing the wall of the pipe being formed, a table at the issue from said conveyor band, adapted to receive the pipes just formed, an endless chain of carrying idling rollers, a sliding guide on which the rollers of the upper portion of said chain roll, so that the still fresh formed pipes which are caused to roll on said roller chain, are supported by pairs of rollers of the chain as they are fed towards the outlet end of the apparatus and are rolled during said feed on said carrying rollers.

4. Apparatus for manufacturing an endless fibro-cement sheet for making pipes, comprising a tank continuously fed with a fibro-cement slurry, an endless conveyor band, of which the leading edge reaches within said tank through an opening bored in a tank wall, so as to receive an endless layer of slurry of the desired thickness, sealing means at the edges of said opening for preventing issue of the slurry, a set of carrying rollers arranged under the leading portion of the upper side of the conveyor band, endless strips on both sides of said upper side for retaining the slurry as it is fed, suction box under an intermediate portion of said upper side, said boxes being subjected to a reciprocating movement in a longitudinal direction, a pair of compression rollers near the outlet end of said upper side, a mandrel at the issue from said side, on which the fibro-cement layer is wound, compression means for the pipe wall cooperating with said mandrel, a table at the issue of said conveyor band adapted to receive the pipes just formed, an endless chain of carrying rollers for said pipes at the outlet end of said table, a supporting guide on which the rollers of the upper side of said chain roll, so that the formed pipes are subjected, as they are aged, to a rolling motion on the supporting rollers for consolidating them.

5. Apparatus as claimed in claim 4, and pressure roller cooperating with said suction box for applying to the layer of slurry a preliminary compression.

6. In apparatus for manufacturing an endless fibro-cement sheet, a tank having a bottom and side walls, means for supplying fibro-cement slurry to said tank and maintaining slurry in said tank with a free upper surface at an adjustable constant level, means for agitating the slurry in said tank to keep it mixed, a side wall of said tank having an opening in its upper portion, a belt conveyor having its inlet end in said opening and having an upper run disposed at a predetermined distance below said free upper surface of the slurry in said tank, said conveyor thus constituting an overflow for said tank so that a continuous layer of fibro-cement slurry is formed on said conveyor belt of a thickness equalling the difference in level between the free upper surface of the slurry in the tank and the upper run of said conveyor, and means for dehydrating the layer of slurry thus formed on the conveyor belt.

References Cited in the file of this patent

UNITED STATES PATENTS

| Number | Name | Date |
|---|---|---|
| 222,981 | Binns, Jr. | Dec. 30, 1879 |
| 1,266,673 | Galipeau | May 21, 1918 |
| 1,280,524 | Murray et al. | Oct. 1, 1918 |
| 1,608,564 | Parker | Nov. 30, 1926 |
| 1,786,215 | Mazza | Dec. 23, 1930 |
| 2,077,720 | Seigle et al. | Apr. 20, 1937 |
| 2,422,344 | Easterberg | June 17, 1947 |
| 2,422,345 | Easterberg | June 17, 1947 |
| 2,488,700 | Bidwell | Nov. 22, 1949 |